United States Patent
Heap et al.

(10) Patent No.: US 8,249,766 B2
(45) Date of Patent: Aug. 21, 2012

(54) METHOD OF DETERMINING OUTPUT TORQUE LIMITS OF A HYBRID TRANSMISSION OPERATING IN A FIXED GEAR OPERATING RANGE STATE

(75) Inventors: Anthony H. Heap, Ann Arbor, MI (US); Tung-Ming Hsieh, Carmel, IN (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 973 days.

(21) Appl. No.: 12/255,781

(22) Filed: Oct. 22, 2008

(65) Prior Publication Data
US 2009/0115353 A1    May 7, 2009

Related U.S. Application Data

(60) Provisional application No. 60/985,638, filed on Nov. 5, 2007.

(51) Int. Cl.
*B60L 9/00*    (2006.01)
(52) U.S. Cl. .......................................................... 701/22
(58) Field of Classification Search .................... 701/22, 701/51, 54; 318/8, 9, 139, 434; 477/3
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 8,035,324 B2 * | 10/2011 | Heap | 318/139 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |

(Continued)

*Primary Examiner* — Faye M. Fleming

(57) ABSTRACT

A hybrid transmission is operative to transfer power between an input member and first and second torque machines and an output member in a fixed gear operating range state. The first and second torque machines are connected to an energy storage device. A method for controlling the hybrid transmission includes determining an output torque command at the output member, determining motor torque constraints for the first and second torque machines and determining power constraints for the energy storage device, iteratively selecting candidate input torques transferable to the input member and associated output torques, determining a second torque constraint associated with the candidate input torque, determining a third torque constraint associated with the candidate input torque, and determining a preferred input torque comprising the candidate input torque that achieves the commanded output torque at the output member and satisfies the motor torque constraints for the first and second torque machines, satisfies the power constraints for the energy storage device, and satisfies the second and third torque constraints associated with the candidate input torque when operating in the fixed gear operating range state.

16 Claims, 4 Drawing Sheets

U.S. PATENT DOCUMENTS

| | | |
|---|---|---|
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1* | 5/2009 | Heap ............................... 318/8 |
| 2009/0115350 A1 | 5/2009 | Heap |
| 2009/0115351 A1 | 5/2009 | Heap |
| 2009/0115352 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1* | 5/2009 | Hsieh et al. ....................... 477/3 |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |

| | | |
|---|---|---|
| 2009/0118933 A1 | 5/2009 | Heap |
| 2009/0118934 A1* | 5/2009 | Heap ............................ 701/54 |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1* | 5/2009 | Heap ............................ 701/54 |
| 2009/0118942 A1 | 5/2009 | Hsieh |
| 2009/0118943 A1 | 5/2009 | Heap |
| 2009/0118944 A1* | 5/2009 | Heap et al. ..................... 701/54 |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1* | 5/2009 | Heap et al. ..................... 701/70 |
| 2009/0118962 A1* | 5/2009 | Heap et al. ..................... 701/99 |
| 2009/0118963 A1 | 5/2009 | Heap |
| 2009/0118964 A1* | 5/2009 | Snyder et al. ................... 701/99 |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2011/0178686 A1* | 7/2011 | Morris ........................... 701/51 |
| 2011/0275466 A1* | 11/2011 | Rask et al. ...................... 475/5 |
| 2011/0312461 A1* | 12/2011 | Park ................................ 475/5 |
| 2011/0312462 A1* | 12/2011 | Park ................................ 475/5 |
| 2011/0312463 A1* | 12/2011 | Park ................................ 475/5 |
| 2011/0312464 A1* | 12/2011 | Park et al. ........................ 475/5 |
| 2012/0004062 A1* | 1/2012 | Kim ................................. 475/5 |

* cited by examiner

METHOD OF DETERMINING OUTPUT TORQUE LIMITS OF A HYBRID TRANSMISSION OPERATING IN A FIXED GEAR OPERATING RANGE STATE

CROSS REFERENCE TO RELATED APPLICATIONS

This application claims the benefit of U.S. Provisional Application No. 60/985,638, filed on Nov. 5, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A hybrid transmission is operative to transfer power between an input member and first and second torque machines and an output member in a fixed gear operating range state. The first and second torque machines are connected to an energy storage device. A method for controlling the hybrid transmission includes determining an output torque command at the output member, determining motor torque constraints for the first and second torque machines and determining power constraints for the energy storage device, iteratively selecting candidate input torques transferable to the input member and associated output torques, determining a second torque constraint associated with the candidate input torque, determining a third torque constraint associated with the candidate input torque, and determining a preferred input torque comprising the candidate input torque that achieves the commanded output torque at the output member and satisfies the motor torque constraints for the first and second torque machines, satisfies the power constraints for the energy storage device, and satisfies the second and third torque constraints associated with the candidate input torque when operating in the fixed gear operating range state.

BRIEF DESCRIPTION OF THE DRAWINGS

One or more embodiments will now be described, by way of example, with reference to the accompanying drawings, in which.

DETAILED DESCRIPTION

Figure 1:
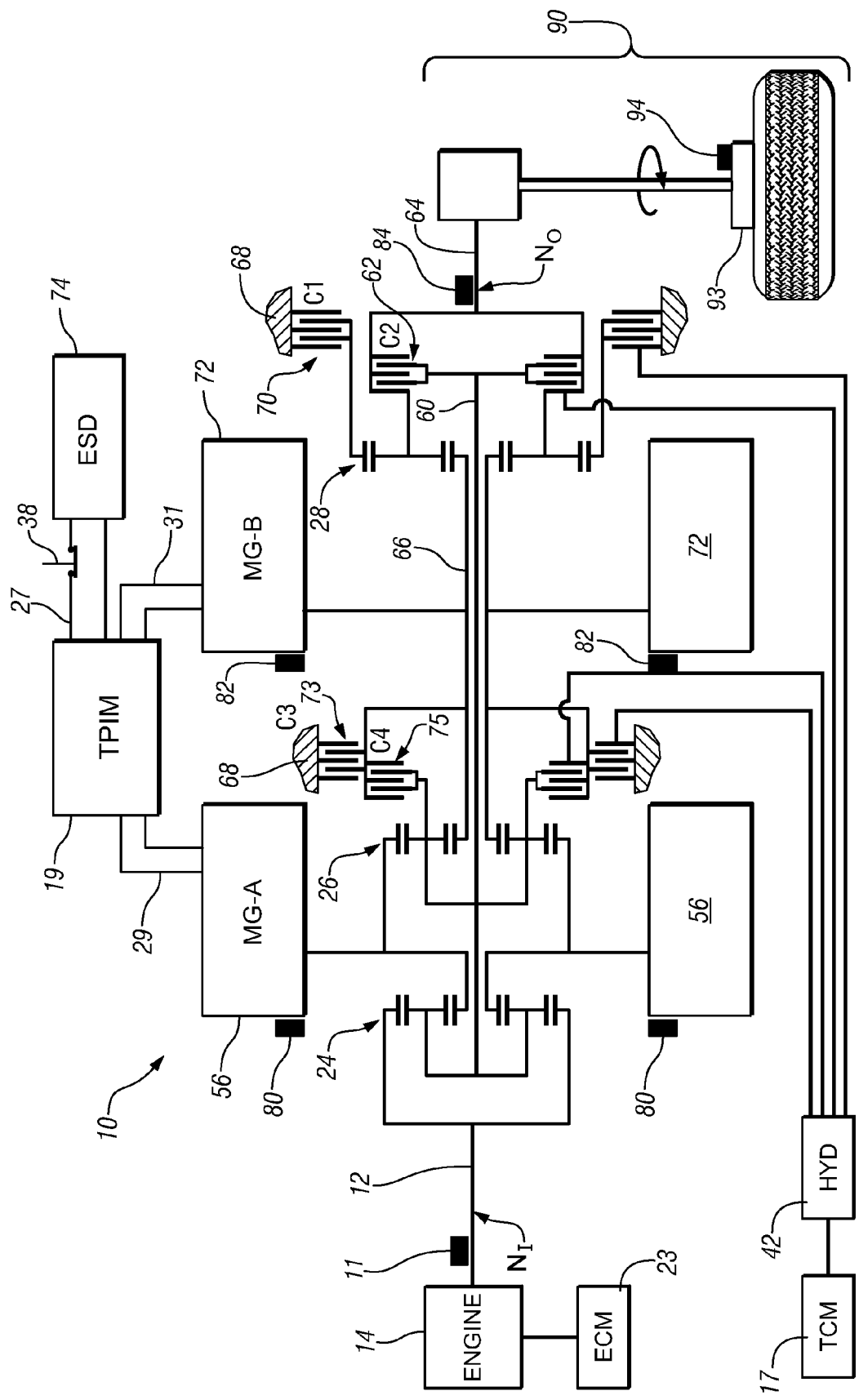
FIG. 1 is a schematic diagram of an exemplary powertrain, in accordance with the present disclosure.
Figure 2:
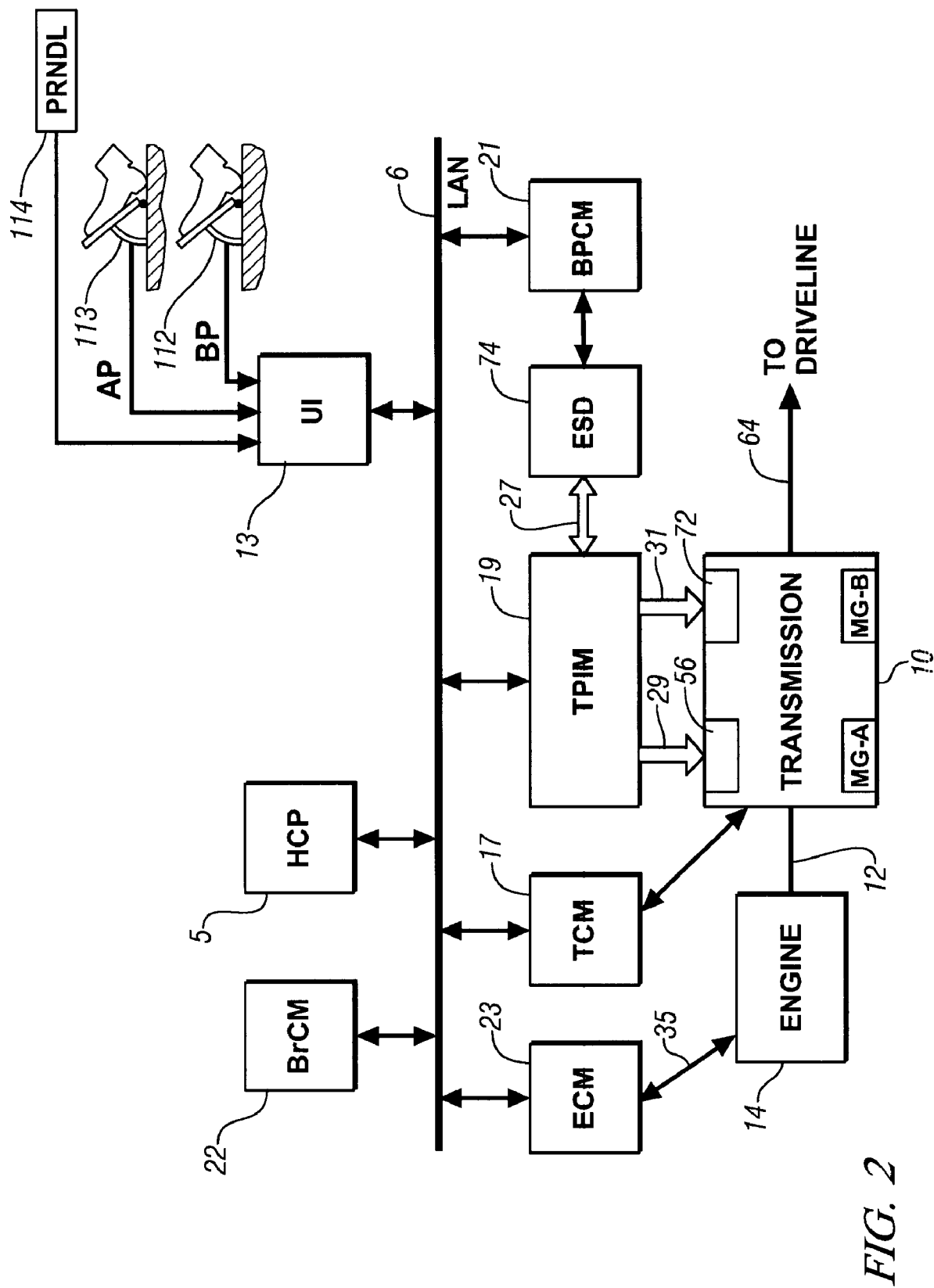
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electro-mechanical hybrid transmission 10 operatively connected to an engine 14 and torque machines comprising first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torque commands $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

By deriving and simultaneously solving dynamics equations of the transmission 10, the torque limit, in this embodiment is the output torque $T_O$, can be determined using the following linear equations.

$$T_{M1} = T_A \text{ to } T_{M1} * T_A + T_B \text{ to } T_{M1} * T_B + \text{Misc}\_T_{M1} \quad [1]$$

The torque limit is subject to $T_{M2}/T_{M3}$ constraints defined by Eqs. 2 and 3.

$$T_{M2} = T_A \text{ to } T_{M2} * T_A + T_B \text{ to } T_{M2} * T_B + \text{Misc}\_T_{M2} \quad [2]$$

$$T_{M3} = T_A \text{ to } T_{M3} * T_A + T_B \text{ to } T_{M3} * T_B + \text{Misc}\_T_{M3} \quad [3]$$

In this embodiment, the torque constraints include the following:

$T_{M1}$: the output torque $T_O$ at output member 64;

$T_{M2}$ and $T_{M3}$ are the clutch torques for the applied ones of torque-transfer clutches C1 70, C2 62, C3 73, and C4 75 of the transmission 10 in the selected fixed gear operating range state;

The terms $T_A$ to $T_{M1}$, $T_A$ to $T_{M2}$; $T_A$ to $T_{M3}$ are contributing factors of $T_A$ to $T_{M1}$, $T_{M2}$, $T_{M3}$, respectively;

$T_B$ to $T_{M1}$, $T_B$ to $T_{M2}$; $T_B$ to $T_{M3}$ are contributing factors of $T_B$ to $T_{M1}$, $T_{M2}$, $T_{M3}$, respectively;

Misc\_$T_{M1}$, Misc\_$T_{M2}$, and Misc\_$T_{M3}$ are constants which contribute to $T_{M1}$, $T_{M2}$, $T_{M3}$ by $N_{I\_DOT}$, $N_{O\_DOT}$, and $N_{C\_DOT}$ which are time-rate changes in the input speed, output speed and clutch slip speed; and $T_A$ and $T_B$ are the motor torques from the first and second electric machines 56 and 72.

The engine 14 and transmission 10 and the first and second electric machines 56 and 72 have speed constraints, torque constraints, and battery power constraints due to mechanical and system limitations. The speed constraints can include engine input speed constraints of $N_I=0$ (engine off state), and $N_I$ ranging from 600 rpm (idle) to 6000 rpm for the engine 14. The speed constraints for the first and second electric machines 56 and 72 can be as follows:

−10,500 rpm $\leq N_A \leq$ +10,500 rpm, and

−10,500 rpm $\leq N_B \leq$ +10,500 rpm.

The torque constraints include engine input torque constraints to the input member 12, comprising $T_{I\_MIN} \leq T_I \leq T_{I\_MAX}$. The torque constraints include motor torque constraints for the first and second electric machines 56 and 72 comprising maximum and minimum motor torques for the first and second electric machines 56 and 72 ('$T_{A\_MAX}$', '$T_{A\_MIN}$', '$T_{B\_MAX}$', '$T_{B\_MIN}$') that are preferably obtained from data sets stored in tabular format within one of the memory devices of one of the control modules. Such data sets are empirically derived from dynamometer testing of the combined motor and power electronics, e.g., the first and second electric machines 56 and 72 and the TPIM 19, at various temperature and voltage conditions. The motor torque outputs of the first and second electric machines 56 and 72 are set such that $T_{A\_MIN} \leq T_A \leq T_{A\_MAX}$ and $T_{B\_MIN} \leq T_B \leq T_{B\_MAX}$, and are dependent upon motor speed. The torque limits comprise torque curves that are speed-based. The motor torque constraints $T_{A\_MAX}$ and $T_{A\_MIN}$ comprise torque limits for the first electric machine 56 when working as a torque-generative motor and an electric generator, respectively. The motor torque constraints $T_{B\_MAX}$ and $T_{B\_MIN}$ comprise torque limits for the second electric machine 72 when working as a torque-generative motor and an electrical generator, respectively. The term $P_{BAT\_MIN}$ is the maximum allowable charging power of the ESD 74 and $P_{BAT\_MAX}$ is the maximum allowable battery discharging power of the ESD 74, with the limits imposed based upon factors related to durability and charge capacity of the ESD 74.

Minimum and maximum values for $T_{M1}$ are determined within the speed constraints, the motor torque constraints, input torque constraints, clutch torque constraints, and the battery power constraints during ongoing operation, in order to control operation of the engine 14, the first and second electric machines 56 and 72, also referred to hereinafter as Motor A 56 and Motor B 72, and the transmission 10 to meet the operator torque request and the commanded output torque.

An operating range, comprising a torque output range is determinable based upon the battery power constraints of the ESD 74. Calculation of battery power usage, $P_{BAT}$ is as follows:

$$P_{BAT} = P_{A,ELEC} + P_{B,ELEC} + P_{DC\_LOAD} \quad [4]$$

wherein $P_{A,ELEC}$ comprises electrical power from the first electric machine 56,
$P_{B,ELEC}$ comprises electrical power from the second electric machine 72, and
$P_{DC\_LOAD}$ comprises known DC load, including accessory loads.

Substituting equations for $P_{A,ELEC}$ and $P_{B,ELEC}$, yields the following:

$$P_{BAT} = (P_{A,MECH} + P_{A,LOSS}) + (P_{B,MECH} + P_{B,LOSS}) + P_{DC\_LOAD} \quad [5]$$

wherein $P_{A,MECH}$ comprises mechanical power from the first electric machine 56,
$P_{A,LOSS}$ comprises power losses from the first electric machine 56,
$P_{B,MECH}$ comprises mechanical power from the second electric machine 72, and
$P_{B,LOSS}$ comprises power losses from the second electric machine 72.

Eq. 5 can be restated as Eq. 6, below, wherein speeds, $N_A$ and $N_B$, and torques, $T_A$ and $T_B$, are substituted for powers $P_A$ and $P_B$. This includes an assumption that motor and inverter losses can be mathematically modeled as a quadratic equation based upon torque.

$$P_{BAT} = (N_A T_A + (a_1(N_A)T_A^2 + a_2(N_A)T_A + a_3(N_A))) + (N_B T_B + (b_1(N_B)T_B^2 + b_2(N_B)T_B + b_3(N_B))) + P_{DC\_LOAD} \quad [6]$$

wherein $N_A$, $N_B$ comprise motor speeds for the first and second electric machines 56 and 72,
$T_A$, $T_B$ comprise the motor torques for the first and second electric machines 56 and 72, and
a1, a2, a3, b1, b2, b3 each comprise quadratic coefficients which are a function of respective motor speeds, $N_A$, $N_B$.
This can be restated as Eq. 7.

$$P_{BAT} = a_1 * T_A^2 + (N_A + a_2) * T_A + b_1 * T_B^2 + (N_B + b_2) * T_B + a3 + b3 + P_{DC\_LOAD} \quad [7]$$

This reduces to Eq 8.

$$P_{BAT} = a_1[T_A^2 + T_A(N_A + a_2)/a_1 + ((N_A + a_2)/(2*a_1))^2] + b_1[T_B^2 + T_B(N_B + b_2)/b_1 + ((N_B + b_2)/(2*b_1))^2] + a3 + b3 + P_{DC\_LOAD} - (N_A + a_2)^2/(4*a_1) - (N_B + b_2)^2/(4*b_1) \quad [8]$$

This reduces to Eq. 9.

$$P_{BAT} = a_1[T_A + (N_A + a_2)/(2*a_1)]^2 + b_1[T_B + (N_B + b_2)/(2*b_1)]^2 + a_3 + b_3 + P_{DC\_LOAD} - (N_A + a_2)^2/(4*a_1) - (N_B + b_2)^2/(4*b_1) \quad [9]$$

This reduces to Eq. 10.

$$P_{BAT} = [SQRT(a_1) * T_A + (N_A + a_2)/(2*SQRT(a_1))]^2 + [SQRT(b_1) * T_B + (N_B + b_2)/(2*SQRT(b_1))]^2 + a_3 + b_3 + P_{DC\_LOAD} - (N_A + a_2)^2/(4*a_1) - (N_B + b_2)^2/(4*b_1) \quad [10]$$

This reduces to Eq. 11.

$$P_{BAT} = (A_1 * T_A + A_2)^2 + (B_1 * T_B + B_2)^2 + C \quad [11]$$

wherein $A_1 = SQRT(a_1)$,
$B_1 = SQRT(b_1)$,
$A_2 = (N_A + a_2)/(2*SQRT(a_1))$,
$B_2 = (N_B + b_2)/(2*SQRT(b_1))$, and
$C = a_3 + b_3 + P_{DC\_LOAD} - (N_A + a_2)^2/(4*a_1) - (N_B + b_2)^2/(4*b_1)$.

Eq. 11 can be restated as follows:

$$P_{BAT} = P_{A\_ELEC} + P_{B\_ELEC} + P_{DC\_LOAD} \quad [11A]$$

wherein $P_{A\_ELEC} = (A_1 * T_A + A_2)^2 + C_A$, and
$P_{B\_ELEC} = (B_1 * T_B + B_2)^2 + C_B$
wherein $C_A = a_3 - (N_A + a_2)^2/(4*a_1)$,
$C_B = b_3 - (N_B + b_2)^2/(4*b_1)$, and
$C = C_A + C_B + P_{DC\_LOAD}$ The motor torques $T_A$ and $T_B$ can be transformed to the $T_X$ and $T_Y$ as follows:

$$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [12]$$

wherein $T_X$ is the transformation of $T_A$,
$T_Y$ is the transformation of $T_B$, and
$A_1$, $A_2$, $B_1$, $B_2$ comprise application-specific scalar values.
Eq. 11 further reduces as follows.

$$P_{BAT} = (T_X^2 + T_Y^2) + C \quad [13]$$

$$P_{BAT} = R^2 + C \quad [14]$$

Eq. 12 specifies the transformation of motor torque, $T_A$ to $T_X$ and the transformation of motor torque $T_B$ to $T_Y$. Thus, a new coordinate system referred to as $T_X/T_Y$ space is defined, and Eq. 13 comprises battery power $P_{BAT}$ transformed into $T_X/T_Y$ space. Therefore, the available battery power between maximum and minimum battery powers $P_{BAT\_MAX}$ and $P_{BAT\_MIN}$ can be calculated and graphed as radii ('$R_{MAX}$' and '$R_{MIN}$') with a center at locus (0, 0) in the $T_X/T_Y$ space, and designated by the letter K, wherein:

$$R_{MIN} = SQRT(P_{BAT\_MIN} - C)$$

$$R_{MAX} = SQRT(P_{BAT\_MAX} - C)$$

The minimum and maximum battery powers, $P_{BAT\_MIN}$ and $P_{BAT\_MAX}$, are preferably correlated to various conditions, e.g. state of charge, temperature, voltage and usage (amp-hour/hour). The parameter C, above, is defined as the absolute minimum possible battery power at given motor speeds, $N_A$, $N_B$, ignoring motor torque limits. Physically, when $T_A = 0$ and $T_B = 0$ the mechanical output power from the first and second electric machines 56 and 72 is zero. Physically $T_X = 0$ and $T_Y = 0$ corresponds to a maximum charging power condition of the hybrid transmission 10. The positive sign ('+') is defined as discharging power from the ESD 74, and the negative sign ('−') is defined as charging power into the ESD 74. $R_{MAX}$ defines a maximum battery power typically a discharging power, and $R_{MIN}$ defines a minimum battery power, typically a charging power.

Eqs. 1, 2, and 3 are restated in the $T_X/T_Y$ space as follows.

$$T_{M1} = T_A \text{ to } T_{M1} * (T_X - A_2)/A_1 + T_B \text{ to } T_{M1} * (T_Y - B_2)/B_1 + \text{Misc}\_T_{M1} \quad [15]$$

$$T_{M2} = T_A \text{ to } T_{M2} * (T_X - A_2)/A_1 + T_B \text{ to } T_{M2} * (T_Y - B_2)/B_1 + \text{Misc}\_T_{M2} \quad [16]$$

$$T_{M3} = T_A \text{ to } T_{M3} * (T_X - A_2)/A_1 + T_B \text{ to } T_{M3} * (T_Y - B_2)/B_1 + \text{Misc}\_T_{M3} \quad [17]$$

Defining $T_{M1\_XY}$, $T_{M2\_XY}$, $T_{M3\_XY}$ as parts of $T_{M1}$, $T_{M2}$, and $T_{M3}$, contributed by $T_A$ and $T_B$ only, then $$T_{M1\_XY} = T_A \text{ to } T_{M1}*(T_X-A_2)/A_1 + T_B \text{ to } T_{M1}*(T_Y-B_2)/B_1, \quad [18]$$

$$T_{M2\_XY} = T_A \text{ to } T_{M2}*(T_X-A_2)/A_1 + T_B \text{ to } T_{M2}*(T_Y-B_2)/B_1, \quad [19]$$

$$T_{M3\_XY} = T_A \text{ to } T_{M3}*(T_X-A_2)/A_1 + T_B \text{ to } T_{M3}*(T_Y-B_2)/B_1. \quad [20]$$

The following coefficients can be defined:

$T_X$ to $T_{M1} = T_A$ to $T_{M1}/A_1$;

$T_Y$ to $T_{M1} = T_B$ to $T_{M1}/B_1$;

$T_{M1}\_\text{Intercept} = T_A$ to $T_{M1}*A_2/A_1 + T_B$ to $T_{M1}*B_2/B_1$;

$T_X$ to $T_{M2} = T_A$ to $T_{M2}/A_1$;

$T_Y$ to $T_{M2} = T_B$ to $T_{M2}/B_1$;

$T_{M2}\_\text{Intercept} = T_A$ to $T_{M2}*A_2/A_1 + T_B$ to $T_{M2}*B_2/B_1$;

$T_X$ to $T_{M3} = T_A$ to $T_{M3}/A_1$;

$T_Y$ to $T_{M3} = T_B$ to $T_{M3}/B_1$; and $T_{M3}\_\text{Intercept} = T_A$ to $T_{M3}*A_2/A_1 + T_B$ to $T_{M3}*B_2/B_1$.

Thus, Eqs. 1, 2, and 3 are transformed to $T_X/T_Y$ space as follows.

$$T_{M1\_XY} = T_X \text{ to } T_{M1}*T_X + T_Y \text{ to } T_{M1}*T_Y + T_{M1}\_\text{Intercept} \quad [21]$$

$$T_{M2\_XY} = T_X \text{ to } T_{M2}*T_X + T_Y 2 T_{M2}*T_Y + T_{M2}\_\text{Intercept} \quad [22]$$

$$T_{M3\_XY} = T_X \text{ to } T_{M3}*T_X + T_Y \text{ to } T_{M3}*T_Y + T_{M3}\_\text{Intercept} \quad [23]$$

Figure 3:
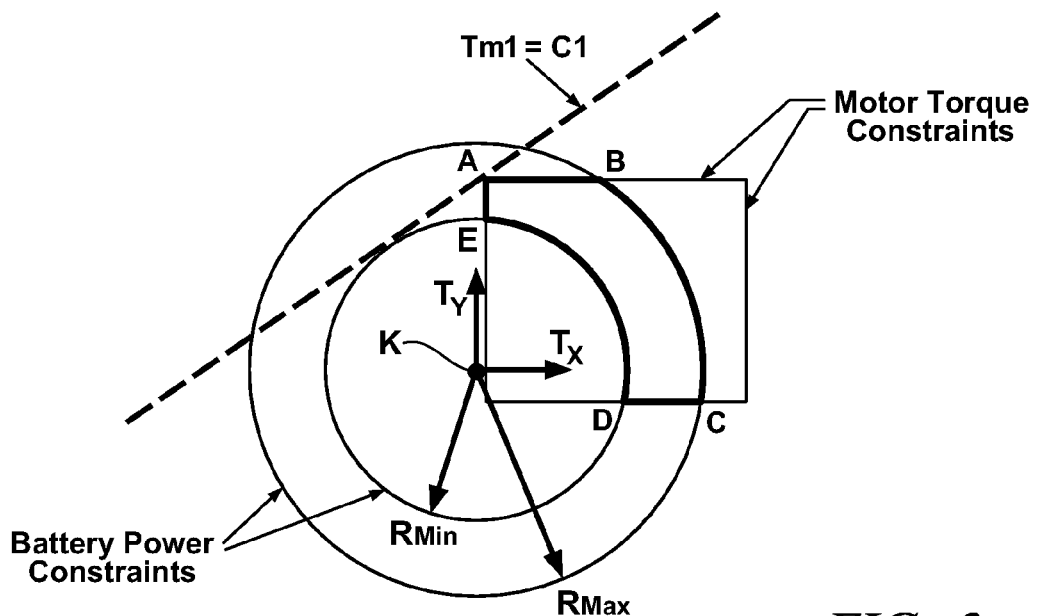
FIGS. 3-5 are graphical diagrams, in accordance with the present disclosure.

The forgoing transformations to the $T_X/T_Y$ space, designated by a locus point K, are shown in FIG. 3, with representations of the battery power constraints as concentric circles having radii of $R_{MIN}$ and $R_{MAX}$ ('Battery Power Constraints'), and linear representations of the motor torque constraints ('Motor Torque Constraints') comprising maximum and minimum motor torques for the first and second electric machines 56 and 72 circumscribing an allowable operating region. Analytically, the transformed vectors determined in Eqs. 16 and 17 are solved simultaneously with the vector defined in Eq. 15 to identify a range of allowable torques for $T_{M1}$ in the $T_X/T_Y$ space constrained by the maximum and minimum motor torques for $T_A$ and $T_B$ and constrained by the minimum and maximum battery powers $P_{BAT\_MIN}$ to $P_{BAT\_MAX}$. The range of allowable motor torques in the $T_X/T_Y$ space is shown with reference to FIG. 3, wherein points A, B, C, D, and E represent the bounds, and lines and radii are defined.

A constant torque line can be defined in the $T_X/T_Y$ space, and depicted in FIG. 3 ('Tm1=C1'), comprising the limit torque $T_{M1\_XY}$, described in Eq. 21, comprising a torque of interest. The limit torque $T_{M1\_XY}$ represents contribution by $T_X$ and $T_Y$ to the torque of interest. The speed constraints, motor torque constraints, and battery power constraints can be determined during ongoing operation and expressed in linear equations which are transformed to $T_X/T_Y$ space.

The torque of interest of the transmission 10, which in this embodiment is the output torque $T_O$, can be determined by using Eq. 21 subject to the $T_{M2\_XY}$ and $T_{M3\_XY}$ constraints defined by Eqs. 22 and 23 to determine a maximum or a minimum limit torque in the $T_X/T_Y$ space, comprising one of $T_{M1\_XY}$Max and $T_{M1\_XY}$Min, in the $T_X/T_Y$ space, e.g., maximum and minimum output torques $T_{O\_MAX}$ and $T_{O\_MIN}$. Subsequently the maximum or minimum limit torque in the $T_X/T_Y$ space can be retransformed out of the $T_X/T_Y$ space to determine maximum or minimum limit torques for managing control and operation of the transmission 14 and the first and second electric machines 56 and 72.

A constant torque line ('Tm1=C') representing line $T_{M1\_XY}$ has a positive slope of a/b of the general form in Eq. 24.

$$Tm1 = a*Tx + b*Ty + C \quad [24]$$

wherein a<0 and b>0 and C is a constant term. In the ensuing descriptions, the line $T_{M1\_XY}$ has a positive slope of 1:1 for purposes of illustration. The x-intercept C of Eq. 24 can change. The output torque line comprises the limit torque function describing the output torque. When operating the transmission 14 in one of the fixed gear operating range states, $T_{M1}$ is the output torque and $T_{M2}$ and $T_{M3}$ are clutch reaction torques for the applied clutches defined for the specific operating range state, i.e., one of G1, G2, G3, and G4. The input torque is a range defined as $T_I\_\text{Min} <= T_I <= T_I\_\text{Max}$.

Thus, Eqs. 21, 22, and 23 can be restated as follows.

$$T_{M1\_XY} = T_{M1} - \text{Misc}\_T_{M1} - T_I \text{ to } T_{M1}*T_I \quad [25]$$

$$T_{M2\_XY} = T_{M2} - \text{Misc}\_T_{M2} - T_I \text{ to } T_{M2}*T_I \quad [26]$$

$$T_{M3\_XY} = T_{M3} - \text{Misc}\_T_{M3} - T_I \text{ to } T_{M3}*T_I \quad [27]$$

Eqs. 25, 26, and 27 indicate that, in one of the fixed gear operating range states, searching for a limit for $T_{M1}$, e.g., a maximum or a minimum output torque can be influenced by the input torque $T_I$ as it contributes to $T_{M1}$ and thus $T_{M1\_XY}$ and also affects the search area of $T_{M2\_XY}$ and $T_{M3\_XY}$.

The torque relationship for the exemplary powertrain system operating in one of the fixed gear operating range states described herein can be represented by Eq. 28.

$$T_A = [a1 \quad a2 \quad a3 \quad a4] \begin{bmatrix} T_I \\ T_B \\ T_O \\ \bullet \\ N_I \end{bmatrix} \quad [28]$$

The relationship described by Eq. 28 indicates that the output torque $T_O$ is directly connected to the input torque $T_I$ when operating in one of the fixed gear operating range states. A change in the input torque $T_I$ changes the output torque, and must be considered in determining a preferred operation of the transmission 10 to meet the output torque command.

A maximum achievable output torque when operating in one of the fixed gear operating range states is determined by determining the maximum output torque that satisfies or meets the motor torque constraints, the battery power constraints, and the clutch reactive torque constraints for the first and second applied clutches when operating at the given input torque. This is preferably accomplished by transforming the constraints to the $T_X/T_Y$ space, as described, and simultaneously solving Eqs. 25, 26, and 27. The maximum achievable output torque and corresponding given input torque for a candidate fixed gear operating range state can be used to evaluate whether the operating range state can achieve the output torque command, and determine the input torque required to achieve the output torque command.

The dynamics equations for the embodiment described are as follows, using Eqs. 1, 2, and 3 above, When the operating range state of the transmission 10 is in G1, the parametric torque equations of Eqs. 1, 2, and 3 are rewritten as follows.

$$T_{M1} = T_O = T_A \text{ to } T_O * T_A + T_B \text{ to } T_O * T_O + \text{Misc}\_T_O \quad [1B]$$

$$T_{M2} = T_{C1} = T_A \text{ to } T_{C1} * T_A + T_B \text{ to } T_{C1} * T_B + \text{Misc}\_T_{C1} \quad [2B]$$

$$T_{M3} = T_{C4} = T_A \text{ to } T_{C4} * T_A + T_B \text{ to } T_{C4} * T_B + \text{Misc}\_T_{C4} \quad [3B]$$

When the operating range state of the transmission 10 is in G2, the parametric torque equations of Eqs. 1, 2, and 3 are rewritten as follows.

$$T_{M1} = T_O = T_A \text{ to } T_O * T_A + T_B \text{ to } T_O * T_O + \text{Misc}\_T_O \quad [1C]$$

$$T_{M2} = T_{C1} = T_A \text{ to } T_{C1} * T_A + T_B \text{ to } T_{C1} * T_B + \text{Misc}\_T_{C1} \quad [2C]$$

$$T_{M3} = T_{C2} = T_A \text{ to } T_{C4} * T_A + T_B \text{ to } T_{C2} * T_B + \text{Misc}\_T_{C2} \quad [3C]$$

When the operating range state of the transmission 10 is in G3, the parametric torque equations of Eqs. 1, 2, and 3 are rewritten as follows.

$$T_{M1} = T_O = T_A \text{ to } T_O * T_A + T_B \text{ to } T_O * T_O + \text{Misc}\_T_O \quad [1D]$$

$$T_{M2} = T_{C2} = T_A \text{ to } T_{C4} * T_A + T_B \text{ to } T_{C2} * T_B + \text{Misc}\_T_{C2} \quad [2D]$$

$$T_{M3} = T_{C4} = T_A \text{ to } T_{C4} * T_A + T_B \text{ to } T_{C4} * T_B + \text{Misc}\_T_{C4} \quad [3D]$$

When the operating range state of the transmission 10 is in G4, the parametric torque equations of Eqs. 1, 2, and 3 are rewritten as follows.

$$T_{M1} = T_O = T_A \text{ to } T_O * T_A + T_B \text{ to } T_O * T_O + \text{Misc}\_T_O \quad [1E]$$

$$T_{M2} = T_{C2} = T_A \text{ to } T_{C4} * T_A + T_B \text{ to } T_{C2} * T_B + \text{Misc}\_T_{C2} \quad [2E]$$

$$TM_3 = T_{C3} = T_A \text{ to } T_{C3} * T_A + T_B \text{ to } T_{C3} * T_B + \text{Misc}\_T_{C3} \quad [3E]$$

Figure 4:
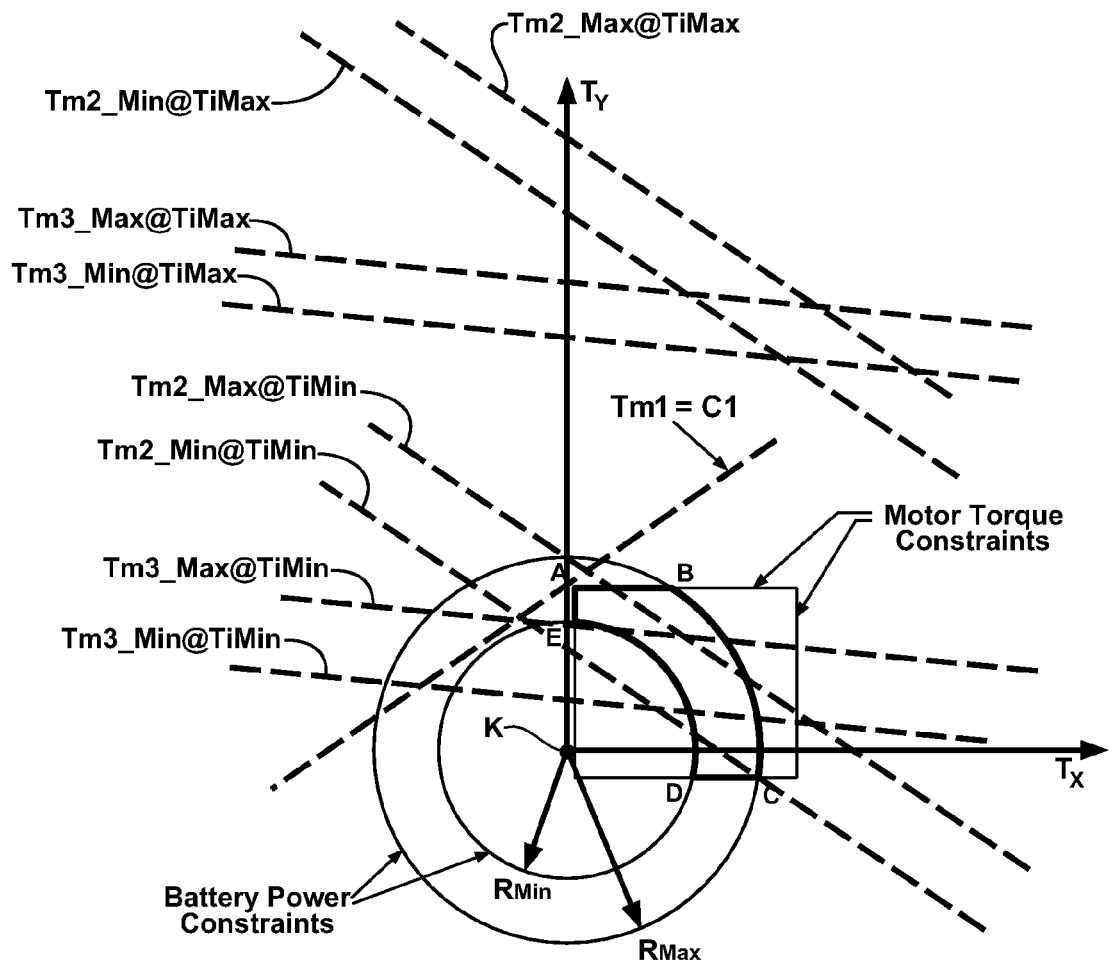

FIG. 4 graphically shows exemplary data illustrating the calculations of the constraints for $T_{M2\_XY}$ and $T_{M3\_XY}$. The process includes evaluating the input torque range by solving each of Eqs. 26 and 27 at the maximum and minimum engine input torque constraints, i.e., solving for $T_{M2\_XY}$ at $T_I = T_{I\_MAX}$ and $T_{M2\_XY}$ at $T_I = T_{I\_MIN}$ and solving for $T_{M3\_XY}$ at $T_I = T_{I\_MAX}$ and $T_{M3\_XY}$ at $T_I = T_{I\_MIN}$. Maximum and minimum $T_{M2\_XY}$ is shown at $T_I = T_{I\_MAX}$ ('Tm2_Max@TiMax', 'Tm2_Min@TiMax') and at $T_I = T_{I\_MIN}$ ('Tm2_Max@TiMin', 'Tm2_Min@TiMin'). Maximum and minimum $T_{M3\_XY}$ is shown at $T_I = T_{I\_MAX}$ ('Tm3_Max@TiMax', 'Tm3_Min@TiMax'), and $T_{M3\_XY}$ at $T_I = T_{I\_MIN}$ ('Tm3_Max@TiMin', 'Tm3_Min@TiMin'). At a given input torque $T_I$, the maximum and minimum $T_{M2\_XY}$ values and the maximum and minimum $T_{M3\_XY}$ values are due to a range of the constraints, e.g. maximum and minimum reactive clutch torques.

The constraints for $T_{M2\_XY}$ and $T_{M3\_XY}$ are evaluated with reference to the motor torque constraints and the battery power constraints in context of the torque of interest ('Tm1=C1'). One of the minimum and maximum input torques is selected as an initial candidate input torque for evaluation, based upon an arithmetic sign of the coefficient $T_I$ to $T_{M1}$ and a choice of a search limit between Tm1_min and Tm1_max. The constraints $T_{M2\_XY}$ and $T_{M3\_XY}$ at the selected one of the maximum or minimum input torque are evaluated at the optimal $T_X/T_Y$ point which meets the motor torque constraints and the battery power constraints to determine if the optimal point also meets the constraints for $T_{M2\_XY}$ and $T_{M3\_XY}$ at the candidate input torque Ti. If the optimal point does not meet the constraints for $T_{M2\_XY}$ and $T_{M3\_XY}$ at the candidate input torque $T_I$, the next candidate input torque can be generated by adjusting the initial candidate input torque comprising the selected one of the maximum or minimum input torque. Adjusting the initial candidate input torque comprises increasing the candidate input torque from the starting point when the starting point is $T_I = T_{I\_MIN}$ by a predetermined increment ('T_I_Increment') or decreasing the candidate input torque from the starting point by the predetermined increment ('T_I_Increment') when the starting point is $T_I = T_{I\_MAX}$. The predetermined $T_I$ Increment is determined by $T_{M2\_XY}$ and $T_{M3\_XY}$ at the optimal point, and the currently selected $T_I$ and $T_{M2\_XY}$ and $T_{M3\_XY}$ limits. This operation is iteratively executed until a candidate input torque is identified that satisfies the battery power constraints, the motor torque constraints, and the system constraints comprising $T_{M1}$, $T_{M2}$, and $T_{M3}$ for the candidate input torque $T_I$.

Figure 5:
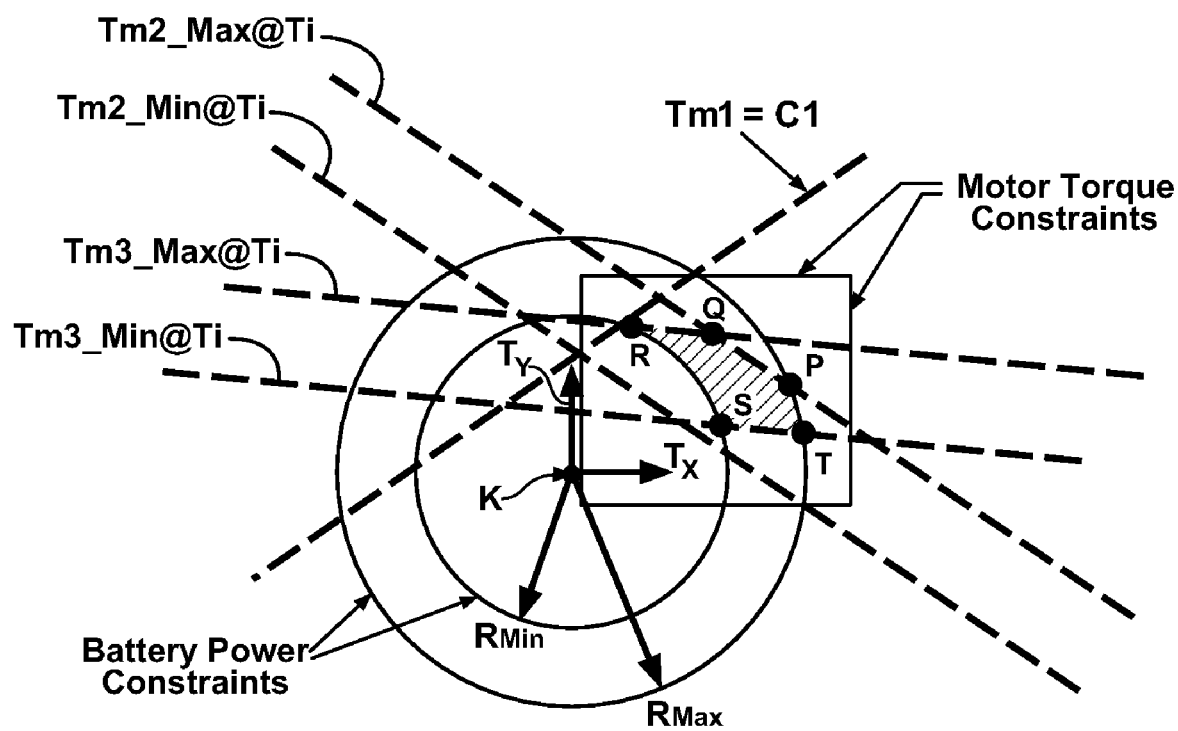

FIG. 5 graphically shows exemplary data illustrating the calculations of the constraints for $T_{M2\_XY}$ and $T_{M3\_XY}$ for a candidate input torque $T_I$. The systems constraints include $T_{M2}$ and $T_{M3}$ as the clutch torque constraints for the first and second applied clutches, as described in Eqs. 1, 2, 3, above, all of which are transformed to $T_X/T_Y$ space. Thus, the system constraints include maximum and minimum $T_{M2\_XY}$ at the candidate input torque $T_I$ ('Tm2_Max@Ti', 'Tm2_Min@Ti') and maximum and minimum $T_{M3\_XY}$ at the candidate input torque $T_I$ ('Tm3_Max@Ti', 'Tm3_Min@Ti'). Points P, Q, R, S, and T, represent the intersections of the lines representing the battery power constraints, the motor torque constraints, and the system constraints comprising $T_{M2}$ and $T_{M3}$ for the candidate input torque $T_I$ in the transformed $T_X/T_Y$ space. The area circumscribed by arc RS, and lines RQ, QP, arc PT, and line ST represents the allowable operating range for operating the powertrain system within the constraints described. The torque of interest is the output torque, i.e., $T_{M1}$ is the output torque $T_O$, shown as a line ('Tm1=C1'). The preferred output torque ('Tm1=C1') as plotted intersects the circumscribed area at point R. In this example, the preferred input torque is the input torque that satisfies the constraints and achieves the output torque. Within the context of this example, the maximum or preferred output torque is the output torque that satisfies the constraints at the preferred input torque, i.e., at point R. If the output torque ('Tm1=C1') increases, indicated by moving the line upwardly leftward, the output torque is not achievable because the maximum constraint for $T_{M3\_XY}$ at the candidate input torque $T_I$ is violated. If the output torque ('Tm1=C1') decreases, indicated by moving the line downwardly rightward, the output torque is less than the achievable output torque for the candidate input torque $T_I$ and can result in lost input torque.

The preferred point, R in this example, is determined and $T_X/T_Y$ coordinates (Tx, Ty) can be determined representing the preferred solution for controlling the powertrain system. The coordinates for R at (Tx, Ty) can be retransformed to motor torques ($T_A$, $T_B$) to control operation of the first and second electric machines 56 and 72 to achieve the output torque. Thus, the preferred minimum or maximum output torque is constrained based upon the speed constraints, the motor torque constraints, the battery power constraints, and the input torque $T_I$ and the clutch torques for the applied clutches in fixed gear operation.

The embodiment described hereinabove is based upon the output torque represented by the line $T_{M1\_XY}$ having a positive slope of a/b of the general form in Eq. 24 as set forth above and repeated herein below:

$$Tm1 = a*Tx + b*Ty + C \quad [24]$$

wherein coefficients a<0 and b>0 and C is a constant term, with a slope of a/b=1:1 for purposes of illustration with the x-intercept C being changeable. The description is applicable to any combinations of coefficients a and b with any slope. Such lines represent regenerative braking during ongoing operation when output torque is negative.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid transmission operative to transfer power between an input member and first and second torque machines and an output member in a fixed gear operating range state, the first and second torque machines connected to an energy storage device, the method comprising:
    determining an output torque command at the output member;
    determining motor torque constraints for the first and second torque machines and determining power constraints for the energy storage device;
    iteratively selecting candidate input torques transferable to the input member and associated output torques;
    determining a second torque constraint associated with the candidate input torque;
    determining a third torque constraint associated with the candidate input torque; and
    determining a preferred input torque comprising the candidate input torque that achieves the commanded output torque at the output member and satisfies the motor torque constraints for the first and second torque machines, satisfies the power constraints for the energy storage device, and satisfies the second and third torque constraints associated with the candidate input torque when operating in the fixed gear operating range state.

2. The method of claim 1, further comprising controlling an engine operatively connected to the input member to generate the preferred input torque.

3. The method of claim 1, wherein selecting candidate input torques transferable to the input member comprises:
    determining a maximum input torque and a minimum input torque;
    determining torque constraints of the second and third torque constraints at the maximum input torque and at the minimum input torque; and
    selecting one of the maximum input torque and the minimum input torque as an initial candidate input torque.

4. The method of claim 3, comprising iteratively generating candidate input torques by incrementally adjusting the initial candidate input torque from the selected one of the maximum and minimum input torques, and determining a corresponding output torque based upon the second and third torque constraints and the motor torque constraints and the power constraints for the energy storage device.

5. The method of claim 4, comprising:
    determining torque constraints of the second and third torque constraints associated with the candidate input torque; and
    determining a maximum output torque based upon the candidate input torque, the second and third torque constraints associated with the candidate input torque, the motor torque constraints and the power constraints for the energy storage device.

6. The method of claim 1, wherein selecting candidate input torques transferable to the input member comprises:
    selecting a candidate input torque;
    determining second and third torque constraints associated with the candidate input torque; and
    determining a maximum output torque based upon the candidate input torque, the second and third torque constraints, the motor torque constraints and the power constraints for the energy storage device.

7. The method of claim 1, further comprising:
    formulating mathematical equations representing the maximum and minimum motor torque constraints for the first and second torque machines respectively comprising $T_{A\_MIN} \leq T_A \leq T_{A\_MAX}$ and $T_{B\_MIN} \leq T_B \leq T_{B\_MAX}$, and representing the maximum and minimum battery power constraints comprising $P_{BAT} = P_{A,ELEC} + P_{B,ELEC} + P_{DC\_LOAD}$;

formulating a mathematical equation representing the output torque comprising $T_{M1} = T_A \text{ to } T_{M1} * T_A + T_B \text{ to } T_{M1} * T_B + \text{Misc}\_T_{M1}$;

formulating mathematical equations representing the second and third torque constraints respectively comprising $T_{M2} = T_A \text{ to } T_{M2} * T_A + T_B \text{ to } T_{M2} * T_B + \text{Misc}\_T_{M2}$ and $T_{M3} = T_A \text{ to } T_{M3} * T_A + T_B \text{ to } T_{M3} * T_B + \text{Misc}\_T_{M3}$;

transforming the mathematical equations representing the maximum and minimum power constraints for the energy storage device to equations of concentric circles having corresponding radii having a center locus point corresponding to a maximum charging power condition for hybrid transmission comprising $P_{BAT} = (T_X^2 + T_Y^2)$;

transforming the mathematical equations representing the maximum and minimum motor torque constraints for the first and second torque machines to equations consisting of lines comprising $$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix};$$

transforming the mathematical equations representing the second and third torque constraints to equations consisting of lines respectively comprising $T_{M2} = T_A \text{ to } T_{M2} * (T_X - A_2)/A_1 + T_B \text{ to } T_{M2} * (T_Y - B_2)/B_1 + \text{Misc}\_T_{M2}$ and $T_{M3} = T_A \text{ to } T_{M3} * (T_X - A_2)/A_1 + T_B \text{ to } T_{M3} * (T_Y - B_2)/B_1 + \text{Misc}\_T_{M3}$; and transforming the mathematical equations representing the output torque to an equation consisting of a line comprising $T_{M1} = T_A \text{ to } T_{M1} * (T_X - A_2)/A_1 + T_B \text{ to } T_{M1} * (T_Y - B_2)/B_1 + \text{Misc}\_T_{M1}$.

8. The method of claim 7, further comprising:
simultaneously solving the transformed mathematical equations representing the maximum and minimum motor torque constraints for the first and second torque machines, the maximum and minimum power constraints for the energy storage device and the second and third torque constraints;
determining at least one transformed achievable output torque and corresponding transformed input torque that satisfies the simultaneously solved transformed mathematical equations; and
retransforming the transformed achievable output torque to determine preferred motor torques for the first and second torque machines.

9. Method for controlling a hybrid transmission, the hybrid transmission operative in one of a plurality of fixed gear operating range states by selectively applying torque transfer clutches to transfer power between an input member and first and second torque machines and an output member, the first and second torque machines connected to an energy storage device, the method comprising:
determining an output torque command at the output member;
determining motor torque constraints for the first and second torque machines and determining battery power constraints for the energy storage device;
iteratively selecting candidate input torques transferable to the input member and associated output torques;
determining a second torque constraint based upon reactive clutch torque of a first selectively applied torque transfer clutch;
determining a third torque constraint based upon reactive clutch torque of a second selectively applied torque transfer clutch; and
determining a preferred input torque comprising the candidate input torque that achieves the commanded output torque at the output member and satisfies the motor torque constraints for the first and second torque machines, satisfies the battery power constraints, and satisfies the second and third torque constraints when operating in the fixed gear operating range state.

10. The method of claim 9, further comprising controlling an engine operatively connected to the input member to generate the preferred input torque.

11. The method of claim 9, wherein selecting candidate input torques transferable to the input member comprises:
determining a maximum input torque and a minimum input torque;
determining torque constraints of the second and third torque constraints at the maximum input torque and the minimum input torque; and
selecting one of the maximum input torque and the minimum input torque as an initial candidate input torque.

12. The method of claim 11, comprising iteratively generating candidate input torques by incrementally adjusting the initial candidate input torque from the selected one of the maximum and minimum input torques, and determining a corresponding output torque based upon the second and third torque constraints and the motor torque constraints and the battery power constraints.

13. The method of claim 12, comprising:
determining torque constraints of the first and second applied torque transfer clutches associated with the candidate input torque; and
determining a maximum output torque based upon the input torque, torque constraints of the first and second applied torque transfer clutches associated with the candidate input torque, the motor torque constraints and the battery power constraints.

14. The method of claim 9, wherein selecting candidate input torques transferable to the input member comprises:
selecting a candidate input torque;
determining torque constraints of the first and second applied torque transfer clutches associated with the candidate input torque; and
determining a maximum output torque based upon the candidate input torque, the torque constraints of the first and second applied torque transfer clutches associated with the candidate input torque, the motor torque constraints and the battery power constraints.

15. The method of claim 9, further comprising:
formulating mathematical equations representing the maximum and minimum motor torque constraints for the first and second torque machines respectively comprising $$T_{A\_MIN} \leq T_A \leq T_{A\_MAX} \text{ and}$$

$$T_{B\_MIN} \leq T_B \leq T_{B\_MAX}, \text{ and}$$

representing the maximum and minimum battery power constraints comprising $$P_{BAT} = P_{A,ELEC} + P_{B,ELEC} + P_{DC\_LOAD};$$

formulating a mathematical equation representing the output torque comprising $$T_{M1} = T_A \text{ to } T_{M1} * T_A + T_B \text{ to } T_{M1} * T_B + \text{Misc}\_T_{M1};$$

formulating mathematical equations representing the torque constraints of the first and second applied torque transfer clutches respectively comprising $$T_{M2} = T_A \text{ to } T_{M2} * T_A + T_B \text{ to } T_{M2} * T_B + \text{Misc}\_T_{M2} \text{ and}$$

$$T_{M3} = T_A \text{ to } T_{M3} * T_A + T_B \text{ to } T_{M3} * T_B + \text{Misc}\_T_{M3};$$

transforming the mathematical equations representing the maximum and minimum battery power constraints to equations of concentric circles having corresponding radii having a center locus point corresponding to a maximum charging power condition for the hybrid transmission comprising $$P_{BAT} = (T_X^2 + T_Y^2) + C;$$

transforming the mathematical equations representing the maximum and minimum motor torque constraints for the first and second torque machines to equations consisting of lines comprising $$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix};$$

transforming the mathematical equations representing the torque constraints of the first and second applied torque transfer clutches to equations consisting of lines respectively comprising $$T_{M2} = T_A T_{M2} * (T_X - A_2)/A_1 + T_B \text{ to } T_{M2} * (T_Y - B_2)/B_1 + \text{Misc}\_T_{M2} \text{ and}$$

$$T_{M3} = T_A \text{ to } T_{M3} * (T_X - A_2)/A_1 + T_B \text{ to } T_{M3} * (T_Y - B_2)/B_1 + \text{Misc}\_T_{M3}; \text{ and}$$

transforming the mathematical equations representing the output torque to an equation consisting of a line comprising:

$$T_{M1}=T_A \text{ to } T_{M1}*(T_X-A_2)/A_1+T_B \text{ to } T_{M1}*(T_Y-B_2)/B_1+\text{Misc\_}T_{M1}.$$

16. The method of claim 15, further comprising:

simultaneously solving the transformed mathematical equations representing the maximum and minimum motor torque constraints for the first and second torque machines and the maximum and minimum battery power constraints, and the torque constraints of the first and second applied torque transfer clutches;

determining at least one transformed achievable output torque and corresponding transformed input torque that satisfies the simultaneously solved transformed mathematical equations; and retransforming the transformed achievable output torque to determine preferred motor torques for the first and second torque machines.

* * * * *